United States Patent
Samuel et al.

(10) Patent No.: US 12,450,140 B2
(45) Date of Patent: Oct. 21, 2025

(54) SYSTEMS AND METHODS FOR ESTIMATING INFORMATION HANDLING SYSTEM PERFORMANCE CAPACITY BASED ON TEMPERATURE AND ACOUSTIC PARAMETERS

(71) Applicant: Dell Products L.P., Round Rock, TX (US)

(72) Inventors: Balasingh Ponraj Samuel, Round Rock, TX (US); Qinghong He, Austin, TX (US); Travis C. North, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 296 days.

(21) Appl. No.: 18/164,950

(22) Filed: Feb. 6, 2023

(65) Prior Publication Data

US 2024/0264919 A1 Aug. 8, 2024

(51) Int. Cl.
*G06F 1/30* (2006.01)
*G06F 1/20* (2006.01)
*G06F 11/30* (2006.01)

(52) U.S. Cl.
CPC .......... *G06F 11/3058* (2013.01); *G06F 1/206* (2013.01)

(58) Field of Classification Search
CPC ...................................................... G06F 1/32
See application file for complete search history.

(56) References Cited

U.S. PATENT DOCUMENTS

| | | | |
|---|---|---|---|
| 11,199,886 B1* | 12/2021 | North ................... | G06F 1/3243 |
| 2002/0184546 A1* | 12/2002 | Sherburne, Jr. ......... | G06F 1/324 |
| | | | 712/E9.024 |
| 2006/0085145 A1* | 4/2006 | Matsuoka .............. | G06F 1/206 |
| | | | 702/57 |
| 2008/0028236 A1* | 1/2008 | Capps .................... | G06F 1/206 |
| | | | 713/300 |
| 2009/0081996 A1* | 3/2009 | Duggal ................. | H04L 67/306 |
| | | | 455/406 |
| 2010/0117579 A1* | 5/2010 | Culbert .................... | G06F 1/20 |
| | | | 318/471 |
| 2012/0083925 A1* | 4/2012 | Scott ....................... | F24F 11/38 |
| | | | 700/275 |
| 2012/0260083 A1* | 10/2012 | Andrews .............. | G06F 9/5094 |
| | | | 713/100 |

(Continued)

*Primary Examiner* — Phil K Nguyen
(74) *Attorney, Agent, or Firm* — Jackson Walker L.L.P.

(57) ABSTRACT

An information handling system may include a processor and a program of instructions embodied in non-transitory computer-readable media, the program of instructions configured to, when read and executed by the processor: determine if an application-related event associated with an executable application has occurred; based on one or more performance profiles, wherein each of the one or more performance profiles are associated with a respective executable application, select an executing application having a highest rank as a selected application; and communicate a selected performance profile associated with the selected application to a management device of the information handling system to cause the management device to apply a temperature limit and an acoustic limit associated with the selected performance profile to the performance of the information handling system.

18 Claims, 2 Drawing Sheets

(56) References Cited

U.S. PATENT DOCUMENTS

| | | | |
|---|---|---|---|
| 2013/0024609 A1* | 1/2013 | Gorobets | G06F 3/0611 |
| | | | 711/E12.008 |
| 2014/0365803 A1* | 12/2014 | Pham | G06F 3/017 |
| | | | 713/324 |
| 2022/0293096 A1* | 9/2022 | Mohapatra | G06F 40/279 |
| 2022/0326750 A1* | 10/2022 | Nakamura | G06F 1/26 |
| 2023/0402027 A1* | 12/2023 | Li | H04R 1/1083 |
| 2024/0134768 A1 | 4/2024 | He et al. | |

* cited by examiner

SYSTEMS AND METHODS FOR ESTIMATING INFORMATION HANDLING SYSTEM PERFORMANCE CAPACITY BASED ON TEMPERATURE AND ACOUSTIC PARAMETERS

TECHNICAL FIELD

The present disclosure relates in general to information handling systems, and more particularly to systems and methods for estimating performance capacity of an information handling system based on temperature and acoustic parameters.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. In addition, generation of heat in an information handling system may increase a skin temperature of an information handling system housing, which may be a particular concern for notebook, laptop, or other mobile devices which a user may hold or rest on the user's person. Accordingly, air movers (e.g., cooling fans and blowers) have often been used in information handling systems to cool information handling systems and their components. However, one disadvantage of existing approaches to thermal control of information handling systems is that oftentimes, air movers generate undesired acoustic noise that may be offensive to a user of the information handling system.

Some existing information handling systems may include power management utilities that allow a user to indicate a user's preference for skin temperature ("cool mode") and/or air mover noise level ("quiet mode"). While many users may be aware that setting an information handling system to operate at a cooler temperature or lower acoustic noise level, and in fact some power management utilities may communicate a generic notice to a user that operation at a cooler temperature and/or lower acoustic noise level may lead to decreased performance of the information handling system, existing power management utilities are unable to quantify an amount or degree by which performance may suffer.

Furthermore, required performance may vary for different applications. However, existing approaches do not automatically adjust performance based on temperature and/or acoustic parameters based on applications being executed on an information handling system.

SUMMARY

In accordance with the teachings of the present disclosure, the disadvantages and problems associated with existing approaches to thermal and acoustical control in information handling systems may be substantially reduced or eliminated.

In accordance with embodiments of the present disclosure, an information handling system may include a processor and a program of instructions embodied in non-transitory computer-readable media, the program of instructions configured to, when read and executed by the processor: determine if an application-related event associated with an executable application has occurred; based on one or more performance profiles, wherein each of the one or more performance profiles are associated with a respective executable application, select an executing application having a highest rank as a selected application; and communicate a selected performance profile associated with the selected application to a management device of the information handling system to cause the management device to apply a temperature limit and an acoustic limit associated with the selected performance profile to the performance of the information handling system.

In accordance with these and other embodiments of the present disclosure, a method may include determining if an application-related event associated with an executable application executing on an information handling system has occurred and based on one or more performance profiles, wherein each of the one or more performance profiles are associated with a respective executable application, selecting an executing application having a highest rank as a selected application. The method may also include communicating a selected performance profile associated with the selected application to a management device of the information handling system to cause the management device to apply a temperature limit and an acoustic limit associated with the selected performance profile to the performance of the information handling system.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to: determine if an application-related event associated with an executable application executing on an information handling system has occurred; based on one or more performance profiles, wherein each of the one or more performance profiles are associated with a respective executable application, select an executing application having a highest rank as a selected application; and communicate a selected performance profile associated with the selected application to a management device of the information handling system to cause the management device to apply a temperature limit and an acoustic limit associated with the selected performance profile to the performance of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
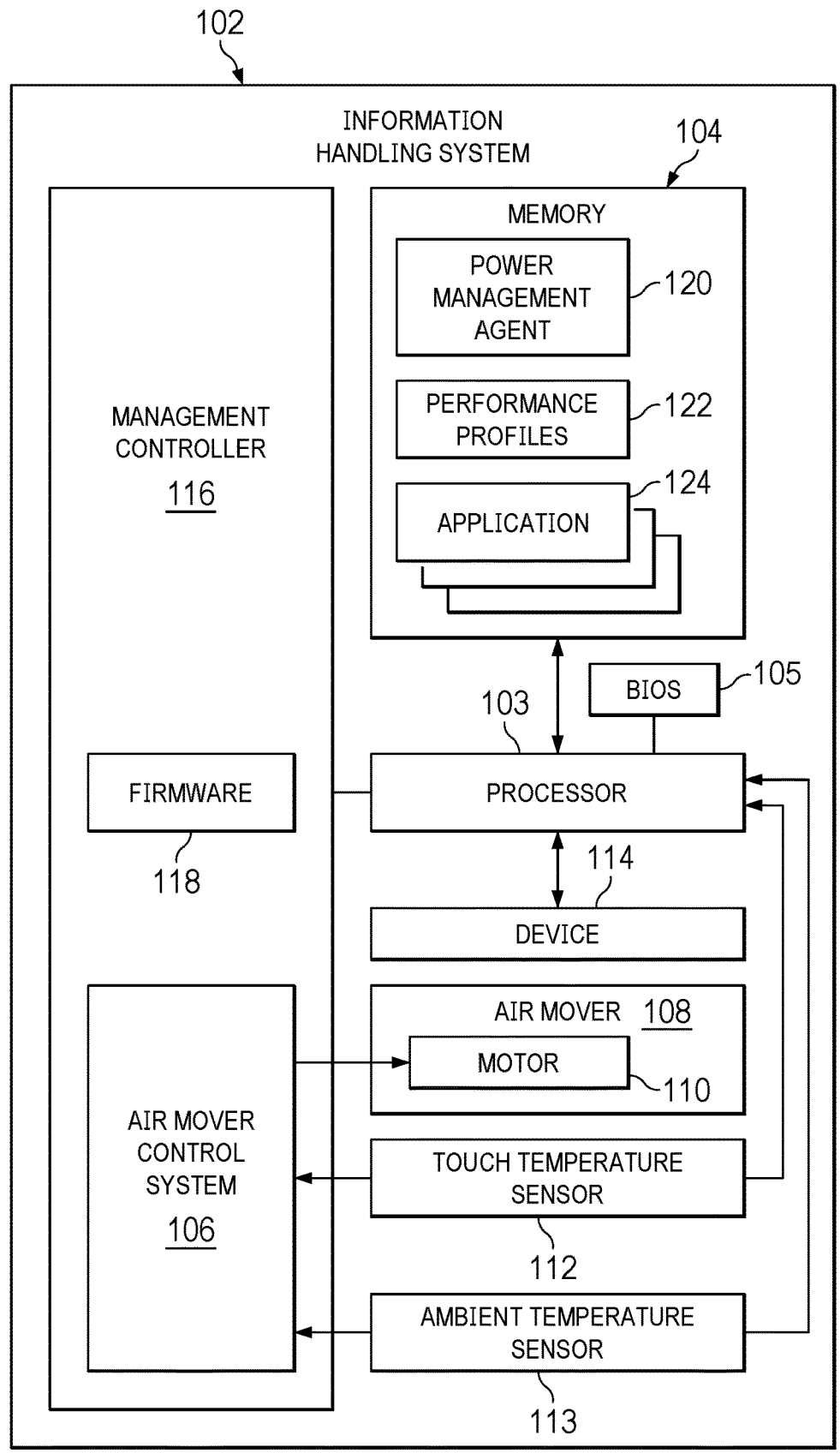
FIG. 1 illustrates a block diagram of an example information handling system, in accordance with embodiments of the present disclosure.
Figure 2:
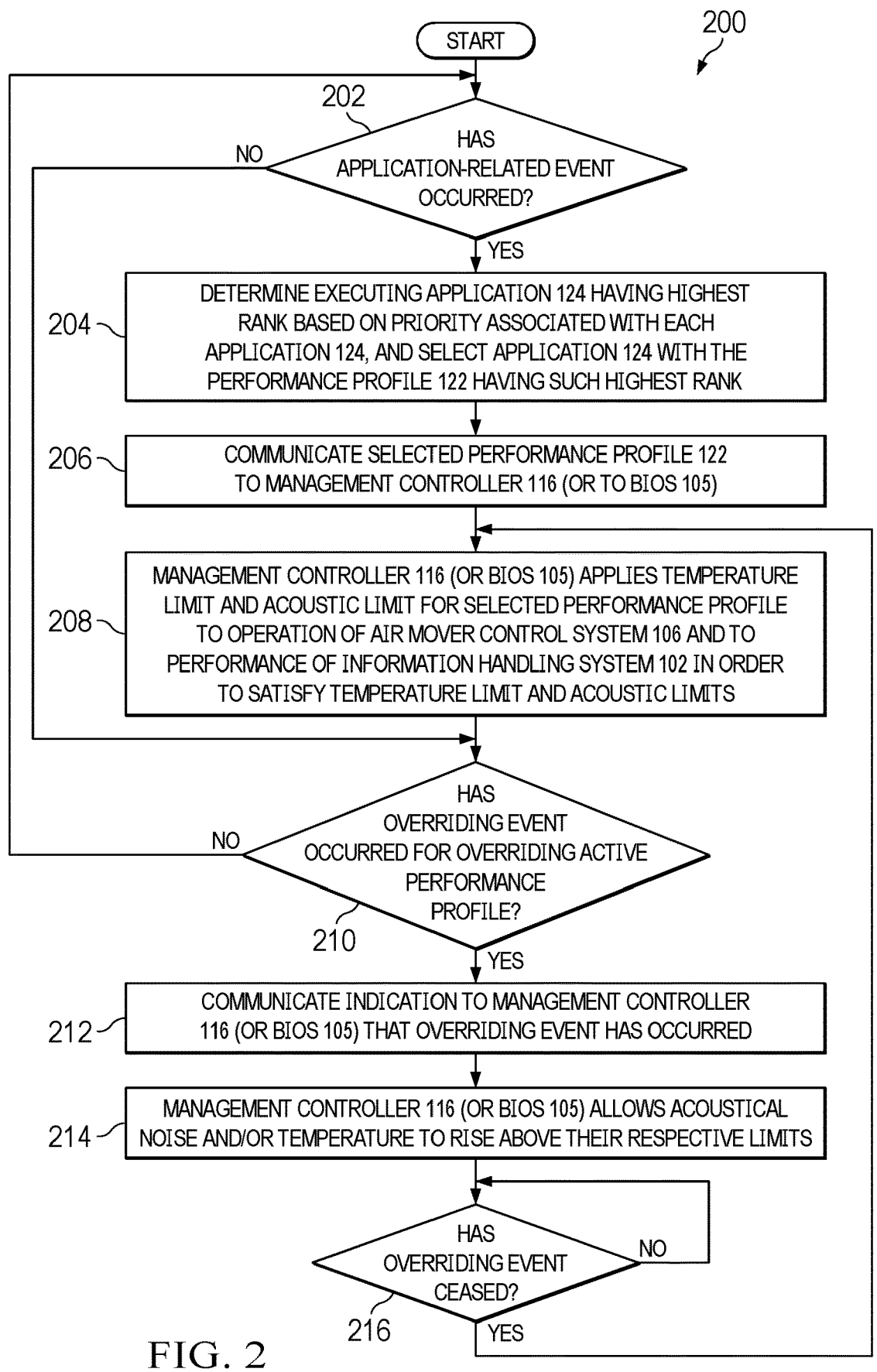
FIG. 2 illustrates a flow chart of an example method for applying temperature, acoustic, and performance profiles to applications, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a block diagram of an example information handling system 102, in accordance with the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, an information handling system 102 may comprise a processor 103, a memory 104 communicatively coupled to processor 103, a basic input/output system (BIOS) 105 communicatively coupled to processor 103, and an air mover 108 communicatively coupled to an air mover control system 106 (e.g., which may be implemented by a management controller 116), a touch temperature sensor 112 communicatively coupled to air mover control system 106 and/or processor 103, an ambient temperature sensor 113 communicatively coupled to air mover control system 106 and/or processor 103, one or more devices 114 communicatively coupled to processor 103, and a management controller 116 communicatively coupled to processor 103.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. As shown in FIG. 1, memory 104 may have stored thereon a power management agent 120, performance profiles 122, and one or more applications 124.

Power management agent 120 may include one or more programs of instructions configured to, when read and executed by processor 103, perform power management operations of information handling system 102, including without limitation, management of performance, temperature, and acoustics of information handling system 102, as described in greater detail below. In some embodiments, power management agent 120 may be a component of an operating system of information handling system 102. In other embodiments, power management agent 120 may comprise a standalone application program or utility configured to execute on top of an information handling system 102.

Performance profiles 122 may comprise a list, map, table, or other data structure that defines, for each of one or more applications 124, a particular profile defining a temperature limit, acoustic limit, and performance limit for such application 124. In some embodiments, one or more performance profiles 122 for applications 124 may be configured by an administrator of information handling system 102, and such performance profiles 122 may be pushed (e.g., from a remote management console application) to information handling system 102 for storage in memory 104. In these and other embodiments, performance profiles 122 for applications 124 may be configured by a user of information handling system 102 (e.g., via management application, such as Dell Command Center). In these and other embodiments, performance profiles 122 for applications 124 may be configured by a vendor of information handling system 102 and/or applications 124.

In some embodiments, an administrator, user, or vendor may configure each of the temperature limit, acoustic limit, and performance limit for a performance profile 122 of an application 124. In other embodiments, an administrator, user, or vendor may configure each of the temperature limit and acoustic limit for a performance profile 122 of an application 124, and power management agent 120 may calculate the performance limit in any suitable manner, including without limitation in accordance with the systems and methods described in U.S. patent application Ser. No. 17/969,046 and filed Oct. 19, 2022, which is incorporated by reference herein in its entirety.

In these and other embodiments, performance profile 122 may be automatically generated using artificial intelligence of machine learning based on system configuration, system state, user persons, power mode (e.g., alternating-current connected or mobile) and/or end-user responsiveness (e.g., switching between applications, interaction with user interface device). In these and other embodiments, performance profile 122 may be secured (e.g., password protected) to prevent modifications to performance profile 122 by malicious applications.

In some embodiments, a performance profile 122 may include a priority for an application 124. The priorities for the various applications 124, as set forth in performance profiles 122, may be used to choose a performance profile 122 for operation of information handling system 102 when multiple applications are executing concurrently.

An application 124 may comprise any program of executable instructions, or aggregation of programs of executable instructions, configured to, when read and executed by processor 103, interact with an operating system (not shown) of information handling system 102 in order to perform a group of coordinated functions, tasks, or activities.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

Air mover 108 may be communicatively coupled to air mover control system 106, and may include any mechanical or electro-mechanical system, apparatus, or device operable to move air and/or other gases. In some embodiments, air mover 108 may comprise a fan (e.g., a rotating arrangement of vanes or blades which act on the air). In other embodiments, air mover 108 may comprise a blower (e.g., a centrifugal fan that employs rotating impellers to accelerate air received at its intake and change the direction of the airflow). In these and other embodiments, rotating and other moving components of air mover 108 may be driven by a motor 110. The rotational speed of motor 110 may be controlled by the air mover control signal communicated from air mover control system 106. In operation, air mover 108 may cool information handling resources of information handling system 102 by drawing cool air into an enclosure housing the information handling resources from outside the chassis, expelling warm air from inside the enclosure to the outside of such enclosure, and/or moving air across one or more heatsinks (not explicitly shown) internal to the enclosure to cool one or more information handling resources.

A touch temperature sensor 112 may be any system, device, or apparatus (e.g., a thermometer, thermistor, etc.) configured to communicate a signal to air mover control system 106 indicative of a "skin" or "touch" temperature indicative of a temperature present on an exterior of a housing of information handling system 102, thus indicating a temperature that might be felt by a user handling information handling system 102.

An ambient temperature sensor 113 may be any system, device, or apparatus (e.g., a thermometer, thermistor, etc.) configured to communicate a signal to air mover control system 106 indicative of a temperature of the ambient environment proximate to information handling system 102.

Device 114 may be communicatively coupled to processor 103 and may generally include any information handling resource.

Management controller 116 may be configured to provide out-of-band management facilities for management of information handling system 102. Such management may be made by management controller 116 even if information handling system 102 is powered off or powered to a standby state. Management controller 116 may include a processor, memory, out-of-band network interface separate from and physically isolated from an in-band network interface of information and/or other embedded information handling system 102, handling resources. In certain embodiments, management controller 116 may include or may be an integral part of a baseboard management controller (BMC) or a remote access controller a (e.g., Dell Remote Access Controller or Integrated Dell Remote Access Controller). In other embodiments, management controller 116 may include or may be an integral part of a chassis management controller (CMC).

As shown in FIG. 1, management controller 116 may include firmware 118 and air mover control system 106.

Firmware 118 may include a program of executable instructions configured to be read and executed by management controller 116 in order to carry out the functionality of management controller 116, including that functionality described herein.

Air mover control system 106 may include any system, device, or apparatus configured to receive one or more signals indicative of one or more temperatures within information handling system 102 (e.g., one or more signals from one or more temperature sensors 112, 113), and based on such one or more signals, determine an air mover driving signal to maintain an appropriate level of cooling, increase cooling, or decrease cooling, as appropriate, and communicate such air mover driving signal to air mover 108. Although FIG. 1 depicts air mover control system 106 integral to management controller 116, in some embodiments, air mover control system 106 may be external to and independent from management controller 116. In addition, although FIG. 1 depicts air mover control system 106 independent from firmware 118, in some embodiments, air mover control system 106 may be implemented within firmware 118.

For ease of exposition, FIG. 1 depicts only one each of air mover control system 106, air mover 108, touch temperature sensor 112, and ambient temperature sensor 113. However, it is noted that information handling system 102 may include two or more air movers 108 and each such air mover 108 may have a dedicated respective air mover control system 106. It is further noted that an air mover control system 106 and/or processor 103 may receive temperature signals from one or more temperature sensors in addition to or in lieu of touch temperature sensor 112 and ambient temperature sensor 113.

In operation, power management agent 120 may determine if an application-related event has occurred, such as an application 124 being opened or closed. In response to the application-related event, power management agent 120 may, based on performance profiles 122, determine the executing application 124 having the highest rank based on the priority associated with each application 124, and select the performance profile 122 having such highest rank. Power management agent 120 may then communicate such performance profile 122 (e.g., at least the temperature limit and acoustic limit associated with such performance profile 122) to management controller 116 (or to BIOS 105 in some embodiments), and management controller 116 (or BIOS 105) may apply such temperature limit and acoustic limit to the operation of air mover control system 106 as well as apply limits to performance of information handling system 102 in order to satisfy the temperature limit and acoustic limit.

Further, in some embodiments, power management agent 120 may determine if an overriding event has occurred for overriding the active performance profile. For example, an overriding event may include a user manually overriding the temperature limit and/or acoustic limit. As another example, an overriding event may include a contextual event, such as when information handling system 102 detects that a user is not present in the vicinity of information handling system 102. In the case of a user not being present in the vicinity of information handling system 102, it may not be as critical to maintain acoustical noise below the acoustic limit and/or maintain a "skin" or "touch" temperature below its limit. Accordingly, during such an event, power management agent 120 may allow acoustical noise and/or temperature to rise above their respective limits, which may allow for increased performance of information handling system 102.

Once such overriding event has ceased (if applicable), power management agent 120 may return operation of information handling system 102 back to limits set by the performance profile 122 for the executing application 124 of highest priority.

FIG. 2 illustrates a flow chart of an example method 200 for applying temperature, acoustic, and performance profiles to applications, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen. In these and other embodiments, method 200 may be implemented as firmware, software, applications, functions, libraries, or other instructions.

At step 202, power management agent 120 may determine if an application-related event has occurred, such as an application 124 being opened or closed. If an application-related event has occurred, method 200 may proceed to step 204. Otherwise, method 200 may proceed to step 210.

At step 204, responsive to occurrence of the application-related event, power management agent 120 may, based on performance profiles 122, determine the executing application 124 having the highest rank based on the priority associated with each application 124, and select the application 124 with the performance profile 122 having such highest rank.

At step 206, power management agent 120 may communicate such performance profile 122 (e.g., at least the temperature limit and acoustic limit associated with such performance profile 122) to management controller 116 (or to BIOS 105 in some embodiments). At step 208, and management controller 116 (or BIOS 105) may apply such temperature limit and acoustic limit to the operation of air mover control system 106 as well as apply limits to performance of information handling system 102 in order to satisfy the temperature limit and acoustic limit.

At step 210, power management agent 120 may determine if an overriding event has occurred for overriding the active performance profile. For example, as described above, an overriding event may include a user manually overriding the temperature limit and/or acoustic limit, a contextual event (e.g., a user not present in the vicinity of information handling system 102), or any other suitable event. If an overriding event has occurred, method 200 may proceed to step 212. Otherwise, method 200 may proceed again to step 202.

At step 212, in response to the overriding event, power management agent 120 may communicate an indication of the overriding event to management controller 116 (or BIOS 105). In response, at step 214, management controller 116 (or BIOS 105) may allow acoustical noise and/or temperature to rise above their respective application-based limits, which may allow for increased performance of information handling system 102.

At step 216, power management agent 120 may determine if the overriding event has ceased. If the overriding event has ceased, method 200 may proceed again to step 208. Otherwise, method 200 may remain at step 216 until the overriding event has ceased.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using a management controller 116, components thereof or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112 (f) unless the words "means for" or "step for" are explicitly used in the particular claim.

What is claimed is:

1. An information handling system comprising:
   a processor; and
   a program of instructions embodied in non-transitory computer-readable media, the program of instructions configured to, when read and executed by the processor:
   determine if an application-related event associated with an executable application has occurred;
   based on one or more performance profiles, wherein each of the one or more performance profiles are associated with a respective executable application, select an executing application having a highest rank as a selected application;
   communicate a selected performance profile associated with the selected application to a management device of the information handling system to cause the management device to apply a temperature limit and an acoustic limit associated with the selected performance profile to the performance of the information handling system;
   determine if an overriding event has occurred for overriding the selected performance profile;
   responsive to determining that the overriding event has occurred for overriding the selected performance profile, communicate an indication to the management device of the occurrence of the overriding event to cause the management device to allow one or both of a temperature to rise above the temperature limit and an acoustical noise to rise above the acoustic limit; and
   responsive to the overriding event ceasing, apply the temperature limit and acoustic limit associated with the selected performance profile to the performance of the information handling system.

2. The information handling system of claim 1, wherein the application-related event comprises an opening of or a closing of the executable application.

3. The information handling system of claim 1, wherein the management device comprises one of either a management controller or a basic input/output system.

4. The information handling system of claim 1, wherein the overriding event comprises a manual override initiated by a user.

5. The information handling system of claim 1, wherein the overriding event comprises a contextual event associated with the information handling system.

6. The information handling system of claim 5, wherein the contextual event comprises a change in user presence proximate to the information handling system.

7. A method comprising:
   determining if an application-related event associated with an executable application executing on an information handling system has occurred;
   based on one or more performance profiles, wherein each of the one or more performance profiles are associated with a respective executable application, selecting an executing application having a highest rank as a selected application;
   communicating a selected performance profile associated with the selected application to a management device of the information handling system to cause the management device to apply a temperature limit and an acoustic limit associated with the selected performance profile to the performance of the information handling system;

determining if an overriding event has occurred for overriding the selected performance profile;

responsive to determining that the overriding event has occurred for overriding the selected performance profile, communicating an indication to the management device of the occurrence of the overriding event to cause the management device to allow one or both of a temperature to rise above the temperature limit and an acoustical noise to rise above the acoustic limit; and responsive to the overriding event ceasing, applying the temperature limit and acoustic limit associated with the selected performance profile to the performance of the information handling system.

8. The method of claim 7, wherein the applicant application-related event comprises an opening of or a closing of the executable application.

9. The method of claim 7, wherein the management device comprises one of either a management controller or a basic input/output system.

10. The method of claim 7, wherein the overriding event comprises a manual override initiated by a user.

11. The method of claim 7, wherein the overriding event comprises a
contextual event associated with the information handling system.

12. The method of claim 11, wherein the contextual event comprises a change in user presence proximate to the information handling system.

13. An article of manufacture, comprising:
a non-transitory computer readable medium; and
computer-executable instructions carried on the computer readable medium, the instructions readable by a processor, the instructions, when read and executed, for causing the processor to:
determine if an application-related event associated with an executable application executing on an information handling system has occurred;
based on one or more performance profiles, wherein each of the one or more performance profiles are associated with a respective executable application, select an executing application having a highest rank as a selected application;
communicate a selected performance profile associated with the selected application to a management device of the information handling system to cause the management device to apply a temperature limit and an acoustic limit associated with the selected performance profile to the performance of the information handling system;
determine if an overriding event has occurred for overriding the selected performance profile;
responsive to determining that the overriding event has occurred for overriding the selected performance profile, communicate an indication to the management device of the occurrence of the overriding event to cause the management device to allow one or both of a temperature to rise above the temperature limit and an acoustical noise to rise above the acoustic limit; and
responsive to the overriding event ceasing, apply the temperature limit and acoustic limit associated with the selected performance profile to the performance of the information handling system.

14. The article of claim 13, wherein the applicant application-related event comprises an opening of or a closing of the executable application.

15. The article of claim 13, wherein the management device comprises one of either a management controller or a basic input/output system.

16. The article of claim 13, wherein the overriding event comprises a manual override initiated by a user.

17. The article of claim 13, wherein the overriding event comprises a contextual event associated with the information handling system.

18. The article of claim 17, wherein the contextual event comprises a change in user presence proximate to the information handling system.

* * * * *